UNITED STATES PATENT OFFICE.

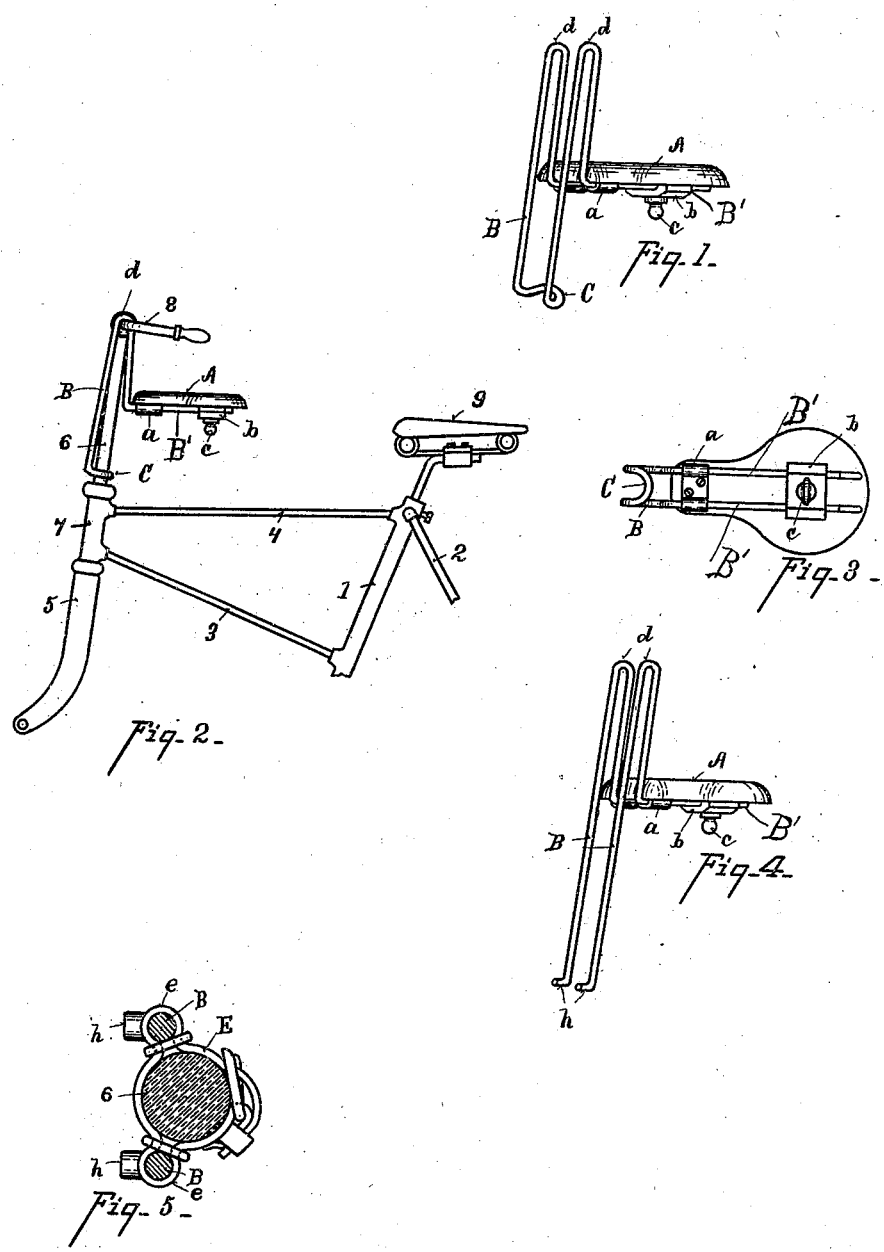

MORRIS S. SHIPLEY, OF CINCINNATI, OHIO.

SUPPLEMENTARY SEAT FOR BICYCLES.

SPECIFICATION forming part of Letters Patent No. 503,170, dated August 15, 1893.

Application filed October 13, 1892. Serial No. 448,839. (No model.)

*To all whom it may concern:*

Be it known that I, MORRIS S. SHIPLEY, a citizen of the United States, residing at Cincinnati, in the county of Hamilton and State of Ohio, have invented certain new and useful Improvements in Supplementary Seats for Bicycles, of which the following is a specification.

My invention relates to means of attaching a saddle to the steering head of a bicycle, which is adapted to carry a second person, or articles may be strapped thereto.

One of the objects of the invention is to provide means for readily attaching and detaching this saddle. Another object of the invention is to so attach the same that it is out of the way of the operator.

The various features of my invention are fully set forth in the description of the accompanying drawings making a part of this specification, in which—

Figure 1 is a perspective view of my improvement. Fig. 2 is a side elevation of the bicycle frame with my improvement attached in position for use. Fig. 3 is a bottom plan view of Fig. 1. Fig. 4 is a modification of Fig. 1. Fig. 5 is a sectional plan view of the coupling device attached to the steering heads.

1 represents the saddle post of the ordinary bicycle, supported over the rear wheel; 2 the rear fork; 3, 4, braces coupling the saddle post to the front fork 5.

6 represents the steering post which projects up through the sleeve 7 and supports the handle bars 8.

I have not shown the wheels nor driving gear, pedals, &c., as all the parts herein described may be of any approved form of construction.

9 represents the ordinary saddle or seat.

My invention relates to the method of attaching the secondary or auxiliary saddle A to the steering rod or post 6. The preferred form of construction shown in Figs. 1, 2, and 3, consists of the bent stirrup B, the upper arms B' B' of which are substantially horizontal and extend through clips *a* and *b* attached to the underside of the auxiliary saddle, in which clips said arms are secured by set screws *c*, in such manner that the horizontally arranged arms B' solely support the auxiliary saddle without the necessity of using an auxiliary front handle bar and fork to aid in supporting said saddle. From the front of the auxiliary saddle the arms comprising the stirrup are bent upwardly in the form of the letter U and extend downwardly and form a semi-circular loop C; the loops *d*, being the curved portion of the U-form, rest upon the handle bars. They are spread apart to go upon each side of the steering post 6. The loop C passes around in rear of the steering post, and the saddle is secured to the free ends of said stirrup. The steering posts and handle bars support and hold the seat firmly in position between the handles, so that the seat and its attaching devices move with the handles, as the steering rod 6 is turned to guide the bicycle, and a package, or small child, may be placed upon the saddle A and be comparatively out of the way of the operator. This seat and its attaching stirrup may be readily taken off and put on as desired.

In the modified form of construction instead of being made of a single wire with the loop C, as shown in Fig. 1, I provide two wires each of which is bent into the U-form and attached to the seat in the same manner as shown in Fig. 1; and to the lower end of said wires or rods is attached a detachable coupling device E. This coupling device is shown as formed of leather strapped around the steering rod and provided with eyes *e*, into which the hooks *h* of the stirrup wires engage, and are held in place in the eyes of the coupling strap by the hooks *h;* which is simply a convenient mode of fastening the detachable stirrup rods to the coupling. By this latter form of construction the strap E which is preferably made of leather may be attached to any style of steering post, and can be adjusted vertically to varying lengths and patterns of steering-rod.

The wire or wires which form the stirrup B are elastic. They may be coiled around and form a coiled spring beneath the saddle, if desired, so as to obtain more elasticity; but the amount of elasticity is not an essential feature of the invention, as a greater or less amount may be made in the stirrup, as required.

For use as a parcel carrier the saddle may be provided with supplemental straps for securing the parcel in place upon the saddle.

Having described my invention, what I claim is—

1. The combination with the steering post 6 and handle bar 8, of the U-shaped stirrup B supported upon the handle bar and engaged at its lower end with the steering post, said stirrup having substantially horizontal arms which solely support an auxiliary saddle A, substantially as described.

2. The combination with the steering post 6, and handle bar 8, of the U-shaped stirrup B supported upon the handle bar and having its upper extremities extended substantially horizontal and solely supporting an auxiliary saddle A, and a coupling E secured to the steering post and provided with eyes $e$ with which the lower ends of the stirrup arms engage, substantially as described.

In testimony whereof I have hereunto set my hand.

MORRIS S. SHIPLEY.

Witnesses:
T. SIMMONS,
C. W. MILES.